(12) United States Patent
Somogyvari et al.

(10) Patent No.: US 7,469,359 B2
(45) Date of Patent: Dec. 23, 2008

(54) METHOD AND APPARATUS FOR TESTING COMMUNICATION SOFTWARE

(75) Inventors: Karoly Somogyvari, Redmond, WA (US); Timothy J. Wynsma, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 11/119,534

(22) Filed: Apr. 29, 2005

(65) Prior Publication Data

US 2006/0248403 A1 Nov. 2, 2006

(51) Int. Cl.
*G06F 11/00* (2006.01)
(52) U.S. Cl. .......................... 714/28; 703/25
(58) Field of Classification Search ............ 703/25; 714/28
See application file for complete search history.

(56) References Cited

U.S. PATENT DOCUMENTS 6,314,531 B1* 11/2001 Kram .................... 714/38
2002/0143960 A1* 10/2002 Goren et al. ............ 709/229
2004/0199370 A1* 10/2004 Arama et al. ............ 703/20
2006/0203846 A1* 9/2006 Davis .................... 370/466

* cited by examiner

*Primary Examiner*—Michael C Maskulinski
(74) *Attorney, Agent, or Firm*—Wolf, Greenfield & Sacks, P.C.

(57) ABSTRACT

A system for testing communication software, such as a network stack that may be used in a personal computer or other computing device. The system includes software to emulate the functionality of hardware of two or more computers. This software may be executed on a single computer, thereby simplifying testing or providing greater control over the test environment by avoiding unintended interactions with hardware connected over a physical network connection. The emulation software includes interfaces that emulate the interfaces used in hardware drivers for network cards in the computers. These interfaces allow the emulation software to interface to the same test applications and tools that would be used in a hardware test so that testing using emulation software may be used instead of or in conjunction with testing using hardware. The emulation software is customizable through the use of modular components, including a component through which user provided code may be readily integrated into the emulation software.

20 Claims, 3 Drawing Sheets

METHOD AND APPARATUS FOR TESTING COMMUNICATION SOFTWARE

BACKGROUND OF INVENTION

1. Field of Invention

This invention relates generally to software development and more particularly to testing of communication software.

2. Discussion of Related Art

Software is often tested as it is developed or upgraded. In many instances, the software is tested in an environment that is as close as possible to its intended operating environment. To test communication software, such as a network stack in a computer, testing is often performed with a computer executing the software to be tested connected to another computer executing test software.

FIG. 1A illustrates a typical hardware test environment that can be used to test a communication software component. In FIG. 1A, computer 110 is connected to computer 112 through physical connection 114, such as a network cable or wireless link.

During a test of communication software, information is exchanged between computers 110 and 112, resulting in the communication software being exercised. FIG. 1B illustrates a software architecture of the typical test environment of FIG. 1A. Computer 110 contains the communication software to be tested, a network stack 122 in the example of FIG. 1B, and a test application 120 that communicates through network stack 122. Network stack 122 in computer 110 is a portion of the operating system, allowing the test application 120 to be developed like a conventional program that runs on the operating system of computer 110.

Network stack 122 communicates with a hardware driver 124 installed in computer 110. Driver 124 is a software component programmed to operate a network card (not shown). Many variations of network cards exist, each of which may have its own driver. To allow any such hardware card to work in a computer, such as a desktop computer, a standard interface is specified between the network stack and the driver. In computers running the WINDOWS® operating system, the interface standard is referred to as NDIS.

Physical connection 114 is provided from the network card in computer 110 to computer 112. Another network card (not shown) is provided in computer 112 and connected to physical connection 114, allowing information to be transmitted from one computer to another over physical connection 114. For some simple tests, the software configuration of machine 112 is identical to that of machine 110.

In computer 112, a second driver 126 controls the network card. Because network stack 122 is being tested, it is often desirable to bypass the network stack in computer 112. Doing so may make it difficult to identify failures cased by network stack 122. To avoid these concerns, test driver 128 communicates directly with hardware driver 126 via an NDIS interface.

Drivers typically include a standard interface that may be used by a network stack or other software components to communicate with the driver. One standard interface uses IOCTL commands. Test tool 130 communicates with test driver 126 using IOCTL commands.

In an operating computer, direct access to a hardware driver may also be available, effectively bypassing the network stack. For example, FIG. 1B shows a bypass path 130 from the top to the network stack to hardware driver 124. In an application running on computer 110, such a path is used, for example, to connect to a network card that includes hardware to perform some or all of the functions performed by a network stack. When the network stack 122 is called by the application and the bypass is available, the network stack does not do any of the work itself but instead just hands the work to the hardware driver 124. To determine whether network stack 122 operates correctly, its impact on all communications, including those using bypass path 130, should be tested. A full test of network stack 122 typically includes testing interactions between the network stack and the bypass path 130.

SUMMARY OF INVENTION

Software components are provided that emulate the interaction of software under test with hardware components. The components also contain an interface to software test tools that, in prior art tests, were coupled to the software under test over a physical connection.

In one aspect, the invention relates to a method of testing a software component under test executing on a first computer. The software component under test is adapted for use in sending a transmission over a network between the first computer and a second computer. The method of testing involves emulating on the first computer a first driver adapted to control hardware interfaced to the network. A second driver adapted to control hardware interfaced to the network is also emulated on the first computer. Emulating the first driver and the second driver comprises emulating the transmission over the network from the first computer to the second computer.

In another aspect, the invention relates to a method of testing a software component under test executing on a first computer. The software component under test is adapted for use in communication over a network between the first computer and a second computer and has a driver interface adapted to interface with a driver controlling hardware coupled to the network. The method of testing involves, in response to a command received from the software component under test, executing on the first computer at least a portion of a first software component having a first interface compatible with the driver interface. Executing the first software component comprises emulating the transmission of information over the network from the first computer and includes executing a function call to a function in a second software component. The method also includes executing on the first computer the function in the second software component in response to the function call from the first software component, wherein executing the function comprises emulating the receipt of information over the network by the second computer.

In a further aspect, the invention relates to a computer-readable medium having computer-executable components for execution on the same processor unit. The computer-readable medium comprises a first component providing a driver interface. The first component has a plurality of groups of computer-executable instructions, each group for emulating an operation of a driver for use in communicating over a network. The first component also has at least one computer executable instruction that selects one of the plurality of groups in response to a command received through the interface. On the computer-readable medium is also a customizable component having a plurality of functions each having a function definition, with at least a portion of the plurality of functions each having a function body comprising user provided instructions. Each of the plurality of groups of computer-executable instructions in the first component comprises at least one computer-executable instruction that calls a predetermined function in the plurality of functions in the customizable component.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
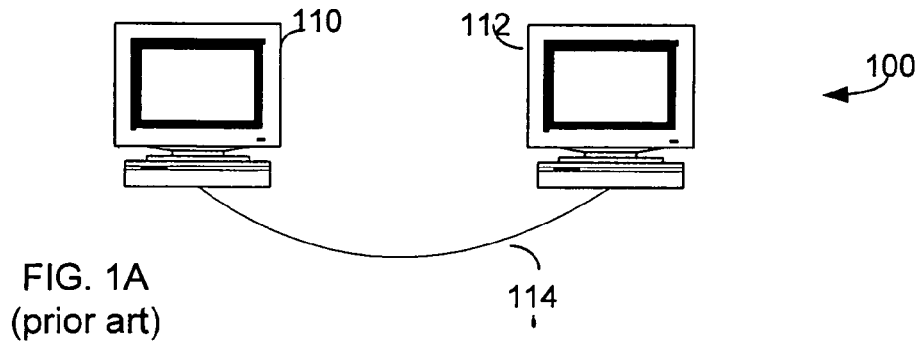
FIG. 1A is a sketch of the hardware configuration of a prior art test environment.

We have recognized that it would simplify testing of communication software if the communication software could be tested on a single computer. The resources needed for testing communication software would be reduced. Further, the testing may be more accurate because communication problems caused by network traffic or other anomalies of the physical network will not create the appearance of problems in the communication software under test. For example, in the prior art test environment of FIG. 1A, when a message is not transmitted properly between computer 110 and 112, a defect in stack 122 is not necessarily the cause. A failure of a transmission may be the result of traffic on the network interconnecting computers 110 and 112, a failure in the hardware or hardware drivers 124 and 126, or other anomalies of communication over the network. By testing without the hardware in place, failures caused by the communication software under test can be more readily identified and isolated.

Communication software to be tested may be any software component in the communication path from one computer to another. In one embodiment, the communication software is a portion of the operating system of a computer, such as may be used to provide network connectivity in a computer. As a specific example, the communication software under test is a network stack.

In one embodiment, an emulation module is provided to facilitate testing of communication software. The emulation module may emulate operation of portions of the communication path outside the communication software under test.

In a specific example described herein, the emulation module is used for testing the network stack in a desktop computer, such as one running programs on the WINDOWS® operating system, but the invention may be used with other operating systems. The emulation module emulates operation of a driver on one computer, a driver on another computer and a physical connection between the two computers.

In some embodiments, the emulation module has interfaces that are compatible with the communication software under test and with test tools that are used in the prior art for testing.

In some embodiments, the emulation module has at least two interfaces. One interface is provided to the software component under test, allowing a test application to cause a component under test to interact with the emulation module. A second interface is provided to a test tool.

The interface to the tool may be provided in the same form that the tool interfaces to a hardware driver in a second computer used in a prior art test environment. However, the test tool may run on the same computer as the emulation module. In this way, the entire test system may be implemented with a single computer.

Some aspects of communication can only be tested using a physical network connection. For example, interactions between the communication software and specific hardware components can only be tested if the actual hardware is used in the test. By emulating the hardware drivers, the test applications and test tools can be used either in single computer testing using the emulation module or can be applied in a multi-computer environment using actual drivers and hardware in place of the emulation module. Full testing of communication software, including testing of those aspects that can only be tested using actual hardware, may be readily performed.

In some embodiments, the emulation module is configurable. Configurability may be provided in any suitable way. One way in which configurability is facilitated is through the use of multiple software components. For example, components are provided to emulate each driver in a multi-computer test environment. Each component may have multiple versions and the emulation module may include a mechanism to specify a particular version to be used for a particular test.

Configurability may also be provided using an extension component. The extension component may provide a ready mechanism for a user to modify the operation of the emulation module, either to better emulate a particular network card or to create scenarios that exercise the software component under test. As one example, the extension component could be modified to intentionally not behave as a properly functioning network card to test the error handling capabilities of the network stack.

Figure 1B:
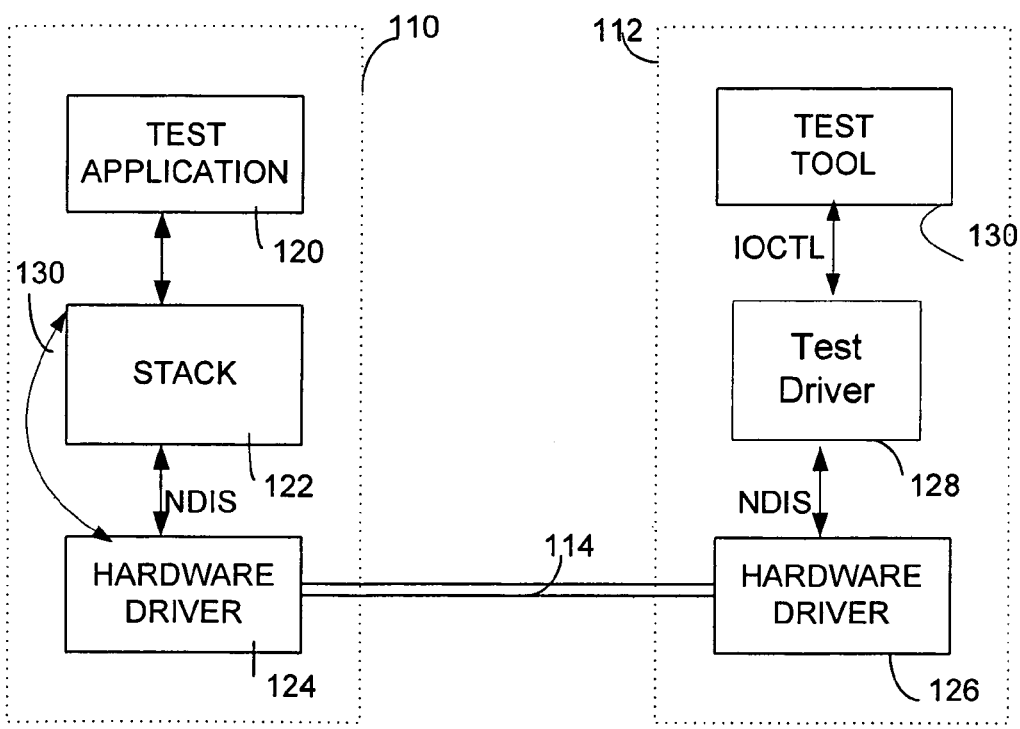
FIG. 1B is a sketch of the software configuration of a prior art test environment.
Figure 2:
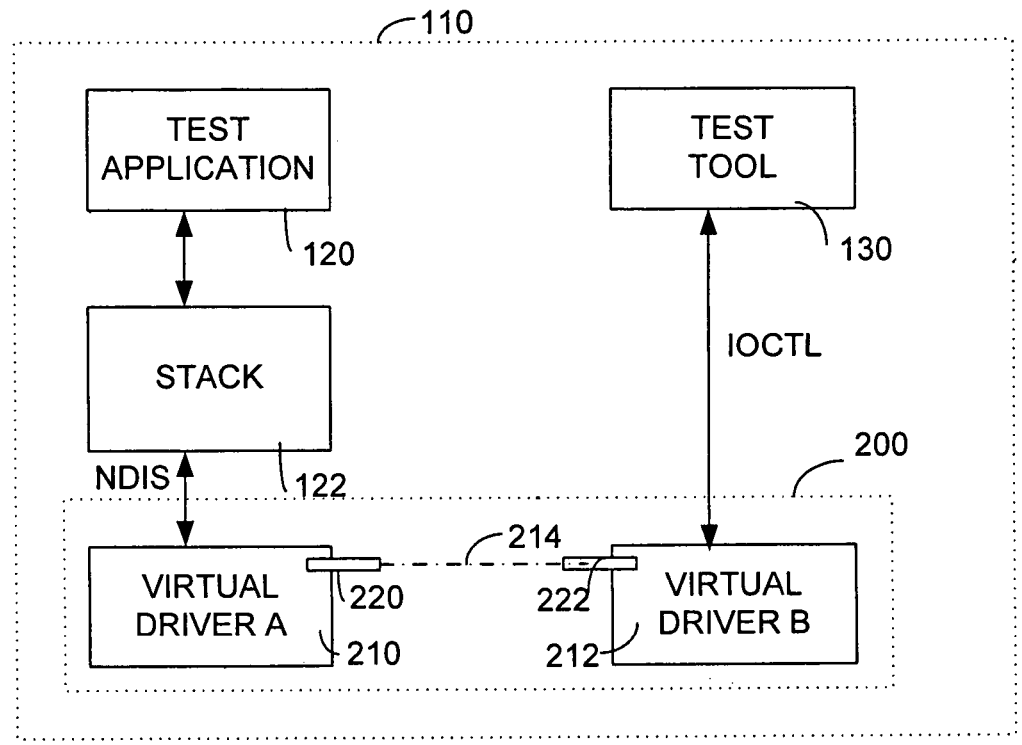
FIG. 2 is a sketch of a software configuration of a test environment according to on embodiment of the invention.

FIG. 2 illustrates a software environment under which testing of communication software may be performed on a single computer 110 in accordance with one embodiment of the invention. Test application 120 and test tool 130 may be used as in the prior art (FIG. 1B), but any suitable test application and test tools may be used.

Testing in this example exercises a portion of the communication software. Here, testing is directed to network stack 122. In the embodiment of FIG. 2, emulation module 200 interfaces to the network stack 122 using an NDIS interface that responds to the commands and generates all of the signals to which hardware driver 124 (FIG. 1B) would respond or generate during a test.

In one embodiment, emulation module 200 is made up of one or more software components that are compatible with a platform, made up of a specific computer and operating system, in which the software component under test operates. Emulation module 200 may be coded in any suitable programming language. As one example, emulation module 200 may be implemented as a collection of modules constructed from computer-executable instructions in the C programming language.

Software components that provide an interface emulating a driver are known. For example, some operating systems have used "tunneling". "Tunneling" refers to providing a software interface in one format to software that communicates in a different format. For example, some drivers communicate using an IPv6 protocol. However, software programs have been developed to communicate using IPv4 protocol. To allow such programs to run on computers with IPv6 protocol, tunneling may be used to provide an interface in a format compatible with IPv4. Techniques as are known in the art to implement such tunneling may be used to construct emulation module 200, but any suitable implementation may be used.

In the embodiment of FIG. 2, emulation module 200 is constructed from two components. Component 210 emulates the driver and hardware in one computer and component 212 emulates the driver and hardware in a second computer.

Components 210 and 212 include interfaces 220 and 222, respectively, that allow the two components to interact. In operation, component 210 may emulate a message transmitted over physical connection 114 from computer 110 to computer 112 by accessing code within component 212 that emulates receipt of the message through interface 222. The converse operation may be emulated by accessing code within component 210 that emulates receipt of the message through interface 220. Interfaces 220 and 222 create a virtual connection 214 emulating physical connection 114 (FIG. 1B).

In an embodiment in which emulation module 200 is written in the C programming language, interfaces 220 and 222 may be implemented using functions. Any function performed in component 210 that would, in a physical implementation, cause the transmission of information to a receiving computer may be implemented with a call to a function in a component emulating a hardware driver for the receiving computer. Because the connection between components 210 and 212 may be entirely contained within emulation module 200, the specific form or construction of the interfaces between components 210 and 212 are not critical to the invention. The interfaces may be implemented as private interfaces within emulation module 200 or in any other suitable form.

Components 210 and 212 include interfaces that allow them to interoperate with the other software components that would interact with hardware drivers in the traditional test environment illustrated in FIG. 1A and FIG. 1B. In some embodiments, components 210 and 212 could be identical though in other embodiments different interfaces may be used. Component 210 has an NDIS interface that allows it to interact with the bottom of network stack 122. Where a bypass path 130 (FIG. 1B) is to be emulated, a further interface may be provided in component 210 to interact with test application 120 in the same that a hardware driver would interact with the test application when the bypass path 130 is used.

Component 212 has an interface that emulates the interface at the top of a test driver or other appropriate driver. Such an interface, for example, may respond to IOCTL commands and allows component 212 to interface with test tool 130. Test tool 130 may be a conventional tool, whether now known or hereafter developed, that can be programmed to generate valid or invalid inputs to a network stack. In the example of FIG. 2, the commands are provided to component 212 without passing through a network stack to reduce the chances that faults will be introduced into the test environment by any source other than the component under test.

Components 210 and 212 may be implemented in any suitable way. In one embodiment, they are implemented as modules in the C programming language that contain a function definition corresponding to each command that may be provided through any interface to the component. Each component contains one or more instructions that receive commands provided through one or more interfaces to the component and invoke the functions corresponding to those commands.

Each function body within a component may be coded to emulate a desired operation of a driver and network card in response to a corresponding command. For example, the function called in response to a command to transmit a packet may emulate transmission of a packet, message or other information to be transmitted over a network. In the described embodiment, transmission of a packet is emulated by placing a call to a function in component 212 that causes component 212 to respond in the same way as a hardware driver that has received a message.

Components 210 and 212 illustrated in FIG. 2 emulate a test environment in which communication occurs between two computers. To perform tests that require emulating communications between more than two computers, more than two components may be used. One component may be used for each computer to be emulated. Each additional component may include an interface in the same form as interfaces 220 and 222. Though it is not required that emulation module 200 be implemented with one component corresponding to each computer in the environment being emulated, partitioning emulation module 200 with one component corresponding to each computer may facilitate easy customization of an emulation module for many test scenarios. An address, comparable to a traditional network address, may be assigned to each component so that one component calling a function in one of the other components may identify which of the other components to access to call the function based on an address associated with information representing a transmission over the network.

Figure 3:
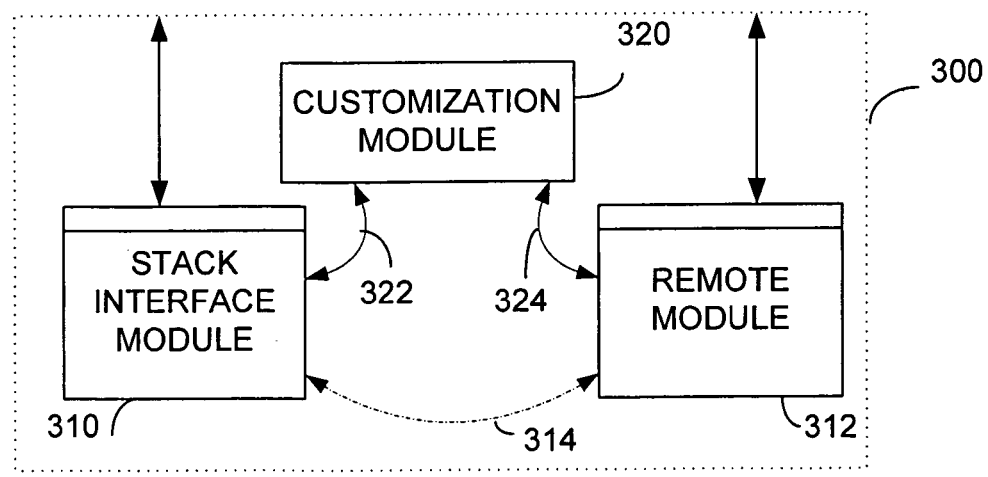
FIG. 3 is a sketch of an alternative embodiment of an emulation module of FIG. 2.

FIG. 3 illustrates an embodiment of an emulation module 300 that facilitates further types of customization. Emulation module 300 is shown in this example to contain three components. Component 310 may be a module prepared in the C programming language that interfaces to a network stack, which in this example is the portion of the communications software under test. Component 310 has an interface to the network stack that may be similar or identical to the one described in connection with component 210.

Component 312 may also be a module prepared in the C programming language that emulates network hardware and supporting operating system software in a remote computer, such as computer 112 (FIG. 1). It may provide an interface to a test tool or other application as described above in connection with component 212 (FIG. 2).

Components 310 and 312 are shown to interact to implement a virtual connection 314 emulating communications over a network. Such a virtual connection may be implemented in any suitable manner, but in the described embodiment, the virtual connection is implemented by function calls.

In the embodiment of FIG. 3, emulation module 300 includes a component 320 that acts as a customization module. Component 320 may be implemented in any suitable way, such as by a module in the C programming language containing multiple functions that may be called from components 310 and 312.

Component 320 may be provided as a "template" into which a user may insert computer-executable instructions to customize emulation module 300. Component 320 may be used, for example, to alter the operation of the other components of emulation module 300 or perform functions that the other components do not perform or to specify the configuration of the other components.

For example, a user may desire to test the interaction of the software component under test with a faulty network card. In this scenario, emulation module 300 is modified to perform functions that emulate an improperly operating network card rather than a correctly operating network card. As another example, a user may wish to test communication software as it runs on a customized network card that performs non-standard functions. In this scenario, emulation module 300 is modified to perform the additional, non-standard functions.

As a further example, information required to configure emulation module 300 for a specific test scenario may be recorded in component 320 so that the other components may be used without modification. For example, components of emulation module 300 emulate network cards in computers attached to a network. It may be desirable to specify the network addresses to be emulated in the test. Rather than provide different components with different network addresses, component 320 may include a data table that can be modified by a user to contain test parameters, such as the network address of each network card to be emulated. Other information in component 320 may specify the number of computers to emulate or, in cases where components for different types of network cards are available, information in component 320 may specify the type of component to be used for each network card to be emulated. Such information may be used to configure emulation module 300 as part of an automated configuration process.

FIG. 3 shows that components 310 and 312 interact with component 320 through hooks 322 and 324. Any suitable form of interface may be used, but in this example the hooks are implemented as function calls from components 310 and 312 to component 320. The function calls may be in various forms. For example, function calls to derive information, such as a network address to emulate, may be in the form of a call to a function that reads a data table in component 320 and responds with the appropriate information.

Other hooks may require a response that is contingent on whether component 320 has been programmed to control the response of emulation module 300 in a certain scenario. Further, actions specified by component 320 may be taken instead of or in addition to actions specified by components 310 and 312 in that scenario.

Figure 4:
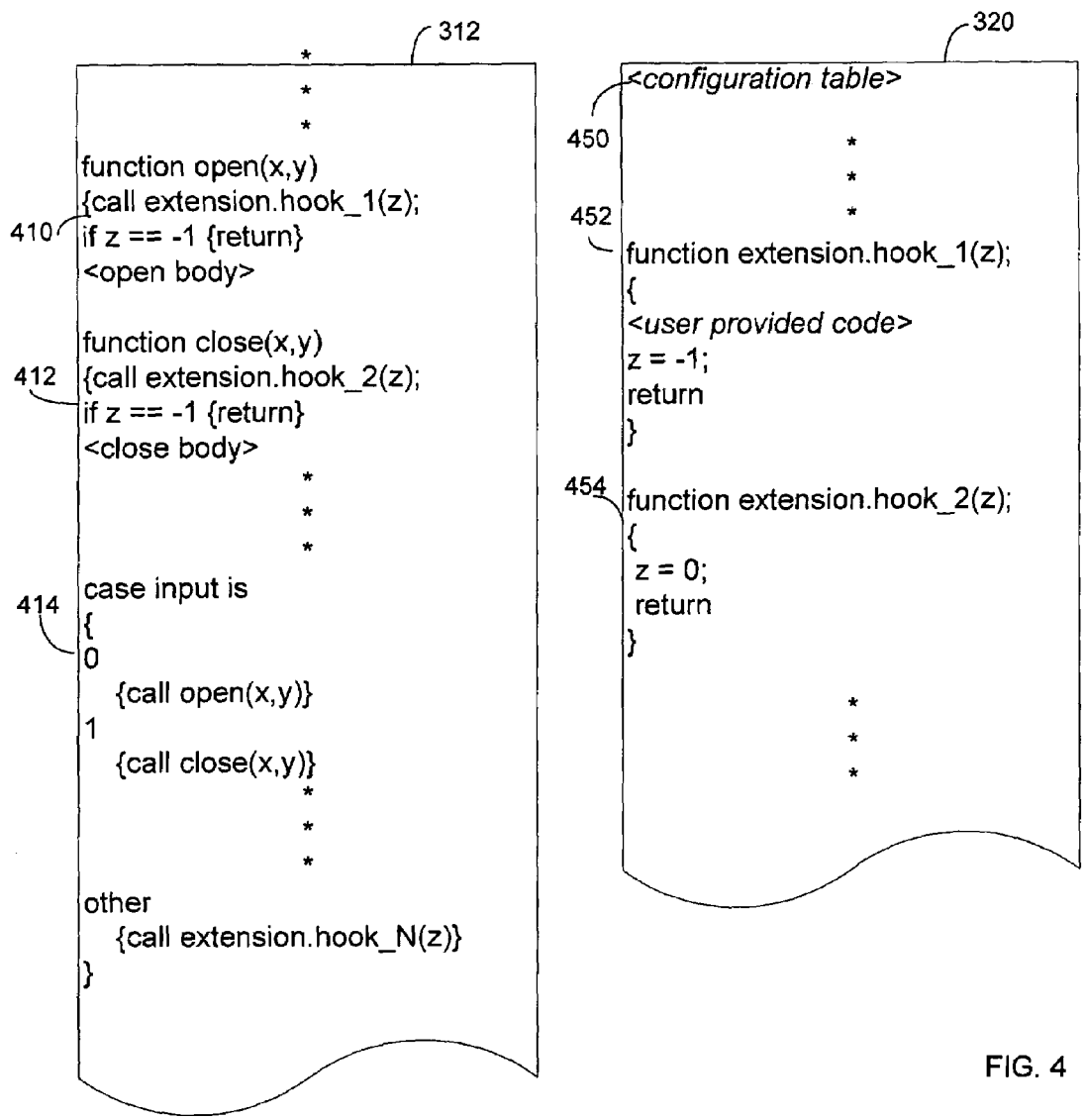
FIG. 4 is a sketch illustrating an implementation of the customization module of FIG. 3.

FIG. 4 illustrates an implementation of hooks that may be provided between components 310 or 312 and component 320. Similar hooks may be provided between component 320 and any other component that may be included in emulation module 300.

In this example, hooks within component 312 are illustrated. Component 312 includes definitions of multiple functions that each implements operations that are to be performed in response to a particular input. The functions within component 312 dictate the operations that are performed during standard processing, but may be customized by programming in component 320.

Component 312 contains function definitions 410 and 412. Function definition 410 defines a function named "open". Function definition 410 includes a function body, identified as <open body>, with code that emulates the required operations when an "open" command is input through the interface to emulation module 300 connected to network stack 122. The code in <open body> defines operations to be performed for standard processing of an open command.

Function definition 410 includes a hook to component 320 that may alter the standard processing. In this example, that hook is implemented as a call to a function extension.hook_1 that allows user specified code to execute when the open command is received at the input of component 312.

The function extension.hook_1 is defined in component 320 at function definition 452. Function definition 452 may include user provided code. The user provided code may be executed either before or instead of the code that performs standard processing of the open command, as defined by the <open body> as part of function definition 410. Any suitable method may be used to selectively execute code in the function body defined in component 312 based on user supplied code in component 320.

In the example illustrated by FIG. 4, a value of a variable returned by the call to the function extension.hook_1 is used to determine whether to execute the body of the open function defined in component 312. Within component 312, the variable z indicates whether the standard function body should be executed after the call to the hook. The value of variable z is set based on user provided code in component 320. If z is set to −1, the open function returns without executing the standard instructions within <open body>. When z has any other value, <open body> is executed after the user provided code that are part of extension.hook_1.

Function definition 412 similarly defines a function that emulates operations to be performed when a "close" command is received. Function definition 412 similarly includes a <close body> containing code to implement standard processing of a close command. Function definition 412 includes a hook to a function extension.hook_2.

As with function extension.hook_1, a definition 454 for this function is provided in component 320. Function definition 454 may likewise alter the variable z to indicate whether <close body> is to be executed after the user supplied code in component 320 is executed. In the example of FIG. 4, the variable z is set to a value, here 0, that signals that standard processing in response to the close command should be performed by executing <close body>. Accordingly, <close body> is executed after the call to extension.hook_2.

In this example, definition 454 includes no user supplied code. Accordingly, the hook implemented by the call to function extension.hook_2 has no effect. No code is executed when it is called and no changes in the execution of code within component 312 result from its execution. However, the definition of the function extension.hook_2 is part of component 320 regardless of whether any user provided code is provided for it. In this embodiment, components 310, 312 and any other components in the emulation module may always refer to that hook and need not be altered when customization is required.

The example of FIG. 4 illustrates only two function definitions that execute instructions to emulate two commands that may be input to emulation module 300. Any number of functions may be provided. In the embodiment of FIG. 4, a case statement 414 selects one of the functions to execute based on an input to component 312. In this embodiment, one function may be provided for each possible input.

In the example of FIG. 4, case statement 414 includes a final branch when the input does not match any input value for which a function is provided. The final branch calls a hook expressed as a call to function extension.hook_N. This hook may contain user defined code that responds to commands that are not part of the standard functionality in component 310 or 312. For example, FIG. 1B shows that some drivers respond to commands received through a bypass path. A test system may be developed that includes components such as 310 and 212 that do not include functions that respond to commands received through the bypass path 130. Functions that respond to such commands may be included in component 320 such that function to respond to any desired commands may be readily incorporated in emulation module 300.

FIG. 4 also illustrates another way in which component 320 may customize the operation of the emulation module 300. Component 320 includes a configuration table 450. Configuration table 450 may be implemented as a record, array or other suitable data structure. Values of any parameters of emulation module 300 that may be specified by a user to customize emulation module 300 may be stored in configuration table 450. Examples of variables that may be stored in configuration table 450 may include network addresses to be used by the components included in emulation module 300. It may alternatively include an indication of the specific components that may be used to represent the hardware being emulated. Any other parameter may likewise be specified. In this way, substantial flexibility is provided.

The functionality of the emulation module described can be used to simplify testing of communications software. Existing test applications and test tools developed for traditional multi-computer testing may be used with the emulation module. The software under test may be tested in a traditional way or may be tested using a single computer to emulate hardware during testing. Further, an emulation module according to the invention makes possible a novel test method that involves performing part of the testing using a single computer test environment as performing some portion of the testing in a traditional multi-computer test environment. Testing according to this method provides for the ease and controllability of using a single computer for testing, but provides for validation of the testing in an actual hardware environment or of testing of aspects that cannot be emulated on a single computer.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above.

Further, the term "function" is used to describe portions of a program. Some programming languages include a construct specifically referred to as a "function." As used herein, the term "function" encompasses such constructs, but is not limited to only such constructs and may include and group of related computer-executable instructions.

Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention. For example, a first computer and a second computer are described above. An operating configuration is defined for these computers in which they are connected over a network. Such a distinction is only relevant when it is desired to test a portion of a communication path between the two computers without using other portions of communication path. Multiple processors may be used to implement either "computer" and these processors may be interconnected in any suitable way. Further, the computers may be connected by a network, even if not used for the portions of the testing without using communications over the network.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of testing at least one software component under test executing on a first computer, the software component under test adapted for use in sending a transmission over a network between the first computer and at least a second computer, the method of testing comprising acts of:
  a) emulating on the first computer a first driver adapted to control hardware interfaced to the network; and
  b) emulating on the first computer a second driver adapted to control hardware interfaced to the network;
  wherein emulating the first driver and emulating the second driver comprises emulating the transmission over the network from the first computer to the second computer.

2. The method of claim 1, further comprising an act of analyzing the emulated transmission over the network processed by the software component under test.

3. The method of claim 2, wherein the act of analyzing the emulated transmission over the network comprises the act of executing a test application on the first computer.

4. The method of claim 3, wherein the act of analyzing the emulated transmission over the network comprises the act of executing a test tool on the first computer to generate a network transmission to be emulated.

5. The method of claim 4, wherein the act of executing a test tool on the first computer to generate a network transmission to be emulated occurs at a first time and the method further comprises, a second time, the acts of:
   c) connecting the first computer to the second computer over the network; and
   d) executing the test tool on the second computer to generate a network transmission to be transmitted over the network from the second computer to the first computer.

6. The method of claim 1, wherein the act of emulating the first driver and emulating the second driver comprises the act of providing customized software on the first computer to emulate non-standard operation of the first driver or the second driver.

7. The method of claim 6, wherein the act of providing customized software on the first computer comprises the act of inserting user provided software at predetermined locations in a template.

8. A method of testing a software component under test executing on a first computer, the software component under test adapted for use in communication over a network between the first computer and a second computer, the software component under test having a driver interface adapted to interface with a driver that controls hardware coupled to the network, the method of testing comprising:
   a) in response to a command received from the software component under test, executing on the first computer at least a portion of a first software component having a first interface compatible with the driver interface, that emulates transmission of information over the network from the first computer at least partially by executing a function call to a function in a second software component; and
   b) executing on the first computer the function in the second software component in response to the function call from the first software component, wherein executing the function comprises emulating receipt of information over the network by the second computer.

9. The method of claim 8, additionally comprising executing a test application on the first computer to cause the software component under test to provide the command through the first interface.

10. The method of claim 9, additionally comprising:
    c) connecting the first computer to the second computer over a network;
    d) configuring the first computer with a first driver and the second computer with a second driver; and
    e) executing the test application on the first computer to cause the software component under test to provide the command to the first driver.

11. The method of claim 8, additionally comprising executing a test tool on the first computer, the test tool generating a representation of information that may be transmitted over the network from the second computer to the first computer, wherein executing the test tool comprises passing a second command through an interface to the second software component.

12. The method of claim 11, wherein passing a command through an interface to the second software component comprises passing an IOCTL command.

13. The method of claim 11, additionally comprising:
    c) connecting the first computer to the second computer over a network;
    d) configuring the first computer with a first driver and the second computer with a second driver; and
    e) executing the test tool on the second computer to transmit information over the network from the second computer to the first computer, wherein executing the test tool comprises passing the command through an interface to the second driver.

14. The method of claim 8, additionally comprising receiving, in the first software component, a command through an NDIS interface.

15. A computer-readable medium having computer-executable components for execution on a same processor unit, the computer-readable medium comprising:
    (a) a first component emulating a first driver of a first computer and providing a driver interface, the first component having:
       i) a plurality of groups of computer-executable instructions, each group for emulating an operation of the first driver for use in communicating over a network, and
       ii) at least one computer executable instruction that selects one of the plurality of groups in response to a command received through the driver interface;
    (b) a customizable component having a plurality of functions each having a function definition, with one or more functions of the plurality of functions each having a function body comprising user provided instructions, and
    (c) a third component emulating a second driver of a second computer;
    wherein at least one group of the plurality of groups of computer-executable instructions emulates a transmission over the network from the first computer to the second computer;
    wherein each of the plurality of groups of computer-executable instructions in the first component comprises at least one computer-executable instruction that calls a predetermined function in the plurality of functions in the customizable component.

16. The computer-readable medium of claim 15, wherein the plurality of groups of computer-executable instructions in the first component further comprises at least one computer-executable instruction that selectively executes a group of computer-executable instructions in the first component in response to the execution of a function in the customizable component.

17. The computer-readable medium of claim 15, wherein the third component has a plurality of groups of computer-executable instructions, each group for emulating an operation of the second driver for use in communicating over the network, wherein at least a portion of the plurality of groups of computer-executable instructions in the first component comprise computer-executable instructions that call a group in the plurality of groups of computer-executable instructions in the third component.

18. The computer-readable medium of claim 17, wherein the customizable component comprises a data table specifying operating parameters of the first component and the third component.

19. The computer-readable medium of claim 18, wherein the data table specifies a network address for the first component and the third component.

20. The computer-readable medium of claim 19, wherein the driver interface of the first component is an NDIS interface.

* * * * *

UNITED STATES PATENT AND TRADEMARK OFFICE
CERTIFICATE OF CORRECTION

| | | |
|---|---|---|
| PATENT NO. | : 7,469,359 B2 | Page 1 of 1 |
| APPLICATION NO. | : 11/119534 | |
| DATED | : December 23, 2008 | |
| INVENTOR(S) | : Karoly Somogyvari et al. | |

It is certified that error appears in the above-identified patent and that said Letters Patent is hereby corrected as shown below:

In column 12, line 27, in Claim 15, delete "instructions," and insert -- instructions; --, therefor.

Signed and Sealed this

Third Day of May, 2011

David J. Kappos
*Director of the United States Patent and Trademark Office*